Aug. 11, 1931.  F. GRITT  1,818,248

DISPLAY DEVICE

Filed Oct. 8, 1930

Inventor
Frank Gritt,
By Rummler, Rummler & Woodworth,
Attys

Patented Aug. 11, 1931

1,818,248

UNITED STATES PATENT OFFICE

FRANK GRITT, OF INDIANAPOLIS, INDIANA, ASSIGNOR, BY MESNE ASSIGNMENTS, TO GRITT INC., OF INDIANAPOLIS, INDIANA, A CORPORATION OF INDIANA

DISPLAY DEVICE

Application filed October 8, 1930. Serial No. 487,250.

This invention relates to means for producing illusory pictorial effects involving the simulation of motion by a combination of mechanical movements and artificial illumination.

The main objects of this invention are to provide a device of this kind having an improved picture panel bearing a pictorial representation of subject matter which is to appear as stationary; to provide another panel behind said picture panel bearing a skeletonized pictorial representation of subject matter to receive the motion effect; to provide improved means concealed by the front panel for projecting intermittent rays of light onto said rear panel to produce an illusory motion effect upon said skeletonized pictorial representation; to provide a structure of this arrangement wherein the pictorial representations on both panels are in complementary visible harmony with one another; and to provide a device of this description which is particularly adapted for use as an advertising display sign wherein the rear panel represents pictorially the passage of a fluid from a source pictorially represented on the front panel.

An illustrative embodiment of this invention is shown in the accompanying drawings, where:

Figure 1:
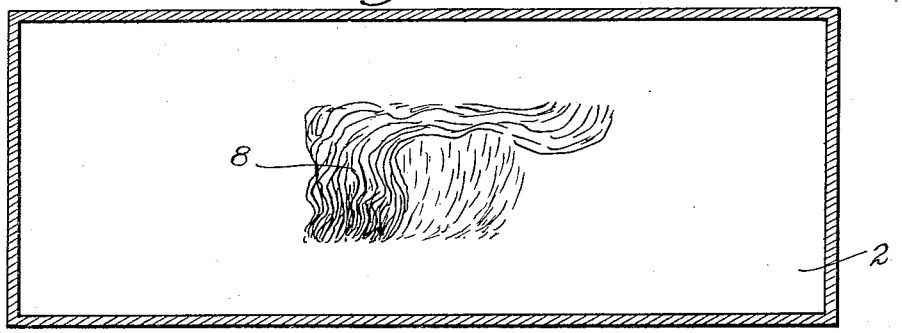
Figure 1 is a vertical section of an improved display device, the view being taken on the line 1—1 of Fig. 3 to show the rear panel which bears a skeletonized representation of the object which is to appear in motion.
Figure 2:
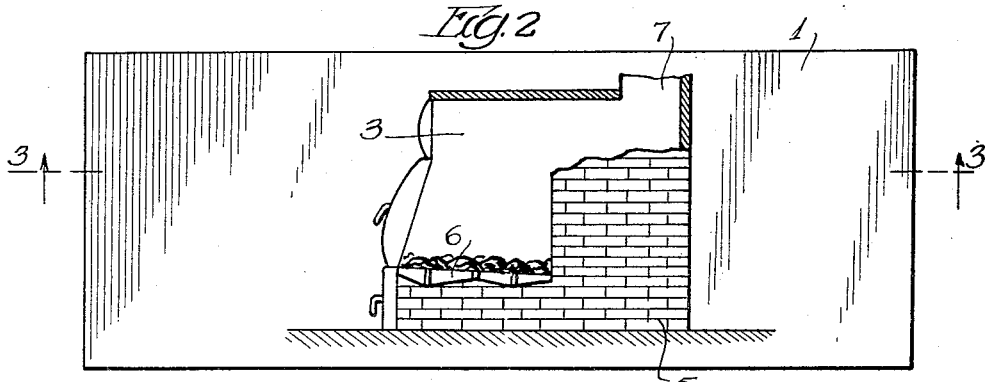
Fig. 2 is a front elevation of the device, showing the front panel which is decoratively designed to represent pictorially the objects which are to appear as stationary.
Figure 3:
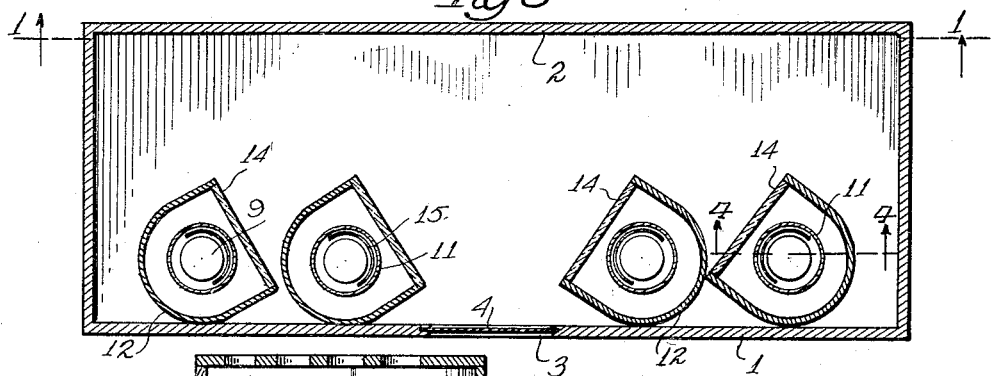
Fig. 3 is a horizontal section, taken on the line 3—3 of Fig. 2.
Figure 4:
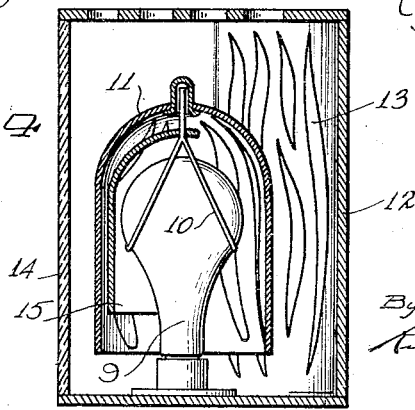
Fig. 4 is an enlarged vertical section of one of the illuminating units, the view being taken on the line 4—4 of Fig. 3.

Display devices embodying this invention may be used in producing a large variety of illusory motion effects which are particularly adapted for advertising purposes. The improved device is especially suitable for outdoor use, because the illusory representations which it produces are more natural and vivid when viewed at a distance than when viewed at close range.

In the embodiment herein shown, the invention is applied to a display device comprising a weatherproof casing having a front opaque panel 1 and a rear opaque panel 2 disposed vertically in substantially parallel spaced relation to each other.

The front face of the front panel 1 is decoratively designed by any suitable means to repersent pictorially the object or objects which are intended to appear to the observer as stationary, and the front face of the rear panel 2 bears a skeletonized representation of the object which is to appear as moving. The representations on both panels are in complementary visible harmony with each other when viewed from a position in front of the device.

In order to permit the observer to see the illusory representation on the rear panel 2, a window 3 is formed in the front panel in the position where the motion effect is desired. A transparent pane 4 is seated in the window 3.

In the form herein shown, the device is designed to create a realistic representation of flames rising from the fuel in a heating plant. For this purpose, the panel 1 bears the picture of a heating plant 5 having the usual grate 6 and flue 7. The window 3 takes the place of the combustion chamber in the picture on the front panel.

The rear panel 2 bears a skeletonized representation of flames 8 located behind the window 3 in complementary visible harmony with the picture on the front panel. The desired illusory motion is imparted to the skeletonized representation 8 by an illuminating mechanism similar to those illustrated in my co-pending applications, Serial No. 404,102, filed November 1, 1929; Serial No. 451,349, filed May 10, 1930; and Serial No. 498,780, filed November 28, 1930. This mechanism is arranged between the two panels, so as to be concealed. It projects, by reflection, intermittent light rays upon the rear panel and thereby creates the illusion of flames which appear to rise from the fuel on the grate 6 toward the flue 7.

In the form shown, the illuminating mechanism includes a battery of units, each of which comprises an incandescent bulb 9 which supports a wire bracket 10 forming a bearing for a rotatable screen 11, which is driven by the heat of the lamp. For large units, the screens may be motor driven. Each lamp is mounted in a substantially semi-cylindrical housing 12, which is provided on its inner wall with a distorted mirror 13 arranged to reflect the intermittent light rays onto the rear panel 2.

The housing 12 has a window 14 facing the skeletonized representation 8 on the rear panel. Located between the window 14 and the light bulb 9, is an opaque screen 15 to prevent any of the light rays from passing directly from the light bulb to the rear panel.

In operation, the intermittent light rays are reflected rearwardly by the distorted mirrors so as to produce the desired motion effect upon the rear panel. When the device is viewed from a position in front of the panel 1, the two panels present a very realistic picture which compels attention.

Although but one specific embodiment of this invention has been herein shown and described, it will be understood that certain details of the construction shown may be altered or omitted without departing from the spirit of this invention as defined by the following claims.

I claim:

1. A device of the class described comprising a rear opaque panel having a substantially flat front face bearing a skeletonized pictorial representation of a moving object, means located in front of said panel for projecting intermittent light rays, a mirror for reflecting said rays upon said skeletonized pictorial representation to effect illusory motion of said object, and a front panel located in front of said means and said mirror, said front panel having a window through which said rear pictorial representation is visible, said front panel bearing a pictorial representation of an object in complementary relation to said rear representation.

2. A device of the class described comprising a rear opaque panel having a substantially flat front face bearing a skeletonized pictorial representation of a moving object, means located in front of said panel for projecting intermittent light rays, a mirror for reflecting said rays upon said skeletonized pictorial representation to effect illusory motion of said object, and a front opaque panel located in front of said means and said mirror, said front panel having a window through which said rear pictorial representation is visible, said front panel bearing a pictorial representation of an object in complementary relation to said rear representation, the pictorial representation on said front panel being impervious to light from within said device.

Signed at Indianapolis this 4th day of October, 1930.

FRANK GRITT.